Jan. 1, 1924 1,479,740
L. REITER
CONNECTER FOR LOOSE LEAF BINDERS
Filed April 11, 1922

WITNESSES
Oliver W. Holmes
E. W. Savage

INVENTOR
Lues Reiter
BY Munn & Co
ATTORNEYS

Patented Jan. 1, 1924.

1,479,740

UNITED STATES PATENT OFFICE.

LUES REITER, OF PROVIDENCE, RHODE ISLAND.

CONNECTER FOR LOOSE-LEAF BINDERS.

Application filed April 11, 1922. Serial No. 551,597.

*To all whom it may concern:*

Be it known that I, LUES REITER, a citizen of the United States, and a resident of Providence, in the county of Providence and State of Rhode Island, have invented new and useful Improvements in Connecters for Loose-Leaf Binders, of which the following is a full, clear, and exact description.

This invention relates to connecters primarily designed for use with loose-leaf binders.

The general object of this invention is the provision of a cheap, efficient and durable connecter that may be attached to a fabric by pressing the various members into engagement with one another.

A further object is the provision of a connecter for a loose-leaf binder provided with a simple collar and eyelet means for attaching a shank of the connecter to the binder.

These objects are accomplished by providing a shank which has a collar mounted thereon attached thereto into which a means for connecting it to the fabric fits and by which it is engaged, and supplying on the upper end of the shank a head capable of being engaged by a spring socket attached to a fabric.

These and other objects of the invention will be more clearly understood from the following detailed description and accompanying drawings, of which—

Figure 1:
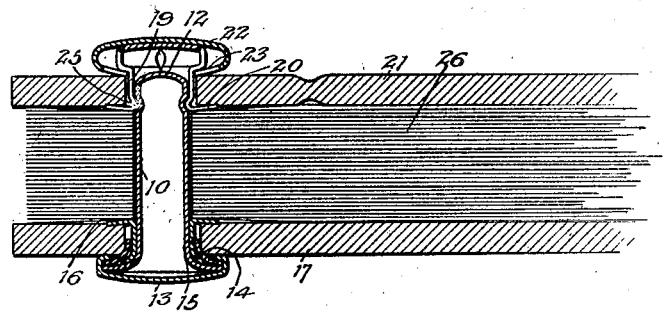
Figure 1 is a section showing the connecter attached to a binder.
Figure 2:
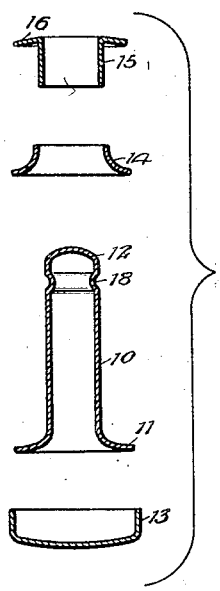
Figure 2 is an exploded view of the shank and means for attaching it to a fabric.
Figure 3:
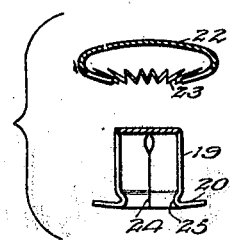
Figure 3 is an exploded view of the socket means and the means for attaching it to the fabric.

Referring to the above-mentioned drawings, a hollow cylindrical shank 10 is shown with a flaring lower end 11 and a head 12 formed on the upper end. A cap 13, the internal diameter of which is equal to the external diameter of the flaring end 11 of the shank, is fitted over the end 11. A collar 14, the outer wall of which is concave in shape, is seated on the flaring end 11, as shown in Figure 1, and the edges of the cap 13 are bent inward, attaching the collar to the end of the shank 10. The inner diameter of the upper end of the collar 14 is greater than the external diameter of the main portion of the shank 10 thus leaving a space between the shank and the collar. An eyelet 15, which is provided with a flange 16, fits over the shank, the tubular portion fitting between the collar 14 and the shank 10. When the shank 10 has been placed in position in one cover 17 of the binder and the eyelet 15 pressed into position to attach the shank to the cover 17 the lower end of the tubular portion spreads outward and engages underneath the collar 14. Thus the shank is firmly attached to the cover 17. A circumferential groove 18 extends about the shank 10 and separates the head 12 from the main portion.

A spring socket 19 provided with a flange 20 is positioned in the other cover 21 of the binder, and a cap 22 provided with serrated edges 23 is positioned over the spring socket. The cap is then forced downward, spreading out the upper portion of the spring socket, as shown in Figure 1, thus attaching the cap 22 to the spring socket and gripping the cover 21 between the flange 20 and the cap 22. The sides of the spring socket 19 are split at 24 so as to allow the lower portion of the socket to spread as it is being forced over the head 12. A circumferential projection 25 is formed between the flange 20 and the main portion of the socket 19 and engages in the groove 18 when the socket is pressed over the head 12.

After the shank has been attached to the cover 17 and the spring socket 19 attached to the cover 21 the sheets of paper or fabric 26 provided with openings are positioned on the shank. Then the spring socket 19 is pressed down over the head 12 so that the circumferential projection 25 engages in the groove 18 and the binder is fastened together.

I would state in conclusion that while the illustrated example constitutes a practical embodiment of my invention I do not limit myself strictly to the exact details herein illustrated since manifestly the same can be considerably varied without departing from the spirit of the invention as defined in the appended claim.

Claim:

A connecter for loose-leaf binders, comprising a shank having a flaring end, an eyelet engaging collar on the shank and seating on the flaring end, a cap mounted on the flaring end of the shank and the eyelet engaging collar clamping them together, an eyelet movably mounted on the shank and adapted for projecting under the eyelet engaging collar for attaching the shank to any fabric, a head formed on the shank, a socket shaped to receive said shank head, and a cap provided in conjunction with the socket for attaching it to any fabric.

LUES REITER.